United States Patent [19]

Zajac

[11] 4,434,966

[45] Mar. 6, 1984

[54] ELECTRO-HYDRAULIC PROPORTIONAL CONTROL VALVE

[75] Inventor: Theodore S. Zajac, Bay Village, Ohio

[73] Assignee: Parker-Hannifin Corporation, Cleveland, Ohio

[21] Appl. No.: 249,538

[22] Filed: Mar. 31, 1981

[51] Int. Cl.[3] ........................ F16K 3/26; F15B 13/043

[52] U.S. Cl. ........................ 251/205; 91/446; 137/625.3; 137/625.64; 137/625.66; 137/625.69; 137/270; 251/121; 251/324

[58] Field of Search ................ 137/270, 625.17, 625.3, 137/625.64, 625.69, 596.13, 625.66, 501; 251/205, 121, 324; 91/501, 446

[56] References Cited

U.S. PATENT DOCUMENTS

| | | | |
|---|---|---|---|
| 476,228 | 5/1892 | Hamilton . | |
| 1,313,105 | 8/1919 | Moran . | |
| 1,913,149 | 6/1933 | Atwater . | |
| 2,936,152 | 5/1960 | Renick | 137/501 X |
| 2,937,656 | 5/1960 | Evans et al. | 251/205 X |
| 3,230,841 | 1/1966 | York . | |
| 3,298,393 | 1/1967 | Mosier . | |
| 3,472,281 | 10/1969 | Chiba et al. | 251/205 X |
| 3,602,243 | 8/1971 | Holt | 91/446 X |
| 3,866,620 | 2/1975 | Morton . | |
| 3,893,481 | 7/1975 | Watts | 137/625.17 |
| 4,238,112 | 12/1980 | Derozier | 137/625.69 X |

*Primary Examiner*—Gerald A. Michalsky
*Attorney, Agent, or Firm*—James A. Baker

[57] ABSTRACT

An electro-hydraulic proportional control valve includes an electro-hydraulic pilot valve, an inlet pressure reducing valve, and a directional control valve. The electro-hydraulic pilot valve receives an electrical input signal and provides a hydraulic signal to the directional control valve in response to the electrical signal. The inlet pressure reducing valve modulates fluid flow from a pump to the directional control valve to maintain a constant pressure drop across the directional control valve under all conditions. The directional control valve includes a directional control valve spool which shifts between a neutral position, a leftward displaced position, and a rightward displaced position in response to the hydraulic signal from the electro-hydraulic pilot valve. The directional control valve spool includes a range adjustment device for adjusting and setting the flow rate through the directional control valve.

6 Claims, 3 Drawing Figures

ELECTRO-HYDRAULIC PROPORTIONAL CONTROL VALVE

BACKGROUND OF THE INVENTION

This invention relates generally to a directional control valve for controlling the flow of fluid between a pump, a motor and a reservoir. More particularly, the invention relates to an electro-hydraulic proportional control valve that provides an accurately controlled fluid flow rate in response to an electrical input signal.

Electro-hydraulic pilot valves are used in the fluid power industry for receiving an electrical input signal and for providing a hydraulic signal in response to the electrical signal. One such electro-hydraulic valve is disclosed in U.S. Pat. No. 3,866,620, the entirety of which is incorporated herein by reference.

The hydraulic signal from the electro-hydraulic pilot valve in these prior art devices is directed to control the position of a directional control valve spool. The directional control valve spool is operable between a neutral position, a leftward position, and a rightward position to direct fluid from a pump to one side of a fluid motor and to return fluid from the other side of the fluid motor to a reservoir. When it is desired to change the flow rate capacity of the directional control valve, it is common practice in the industry to substitute different directional control valve spools with various arrangements and sizes of lands and grooves to provide the desired flow rate capacity.

SUMMARY OF THE INVENTION

The present invention departs from these and other prior art devices by providing an electro-hydraulic proportional control valve which will provide a wide range of flow rates.

According to the principles of the invention, the electro-hydraulic proportional control valve includes an electro-hydraulic pilot valve, an inlet pressure reducing valve and a directional control valve.

The electro-hydraulic pilot valve receives an electrical signal and provides a hydraulic signal in response to the electrical signal. In the preferred embodiment, the electro-hydraulic pilot valve is of the type disclosed in the above-referenced U.S. Pat. No. 3,866,620.

The inlet pressure reducing valve is interposed between a source of fluid pressure and the directional control valve. The inlet pressure reducing valve includes a pressure reducing spool that maintains a predetermined constant pressure differential across the directional control valve under all conditions.

The directional control valve provided by the invention includes a housing having an inlet port, cylinder ports, exhaust ports, and a central bore extending through and interconnecting the ports. A cylindrical sleeve is press-fit in the bore, and passages extending radially through the sleeve to communicate the ports with the interior of the sleeve.

A valve spool is slidably disposed within the sleeve for axial movement between a neutral position, a rightward position, and a leftward position in response to the hydraulic signal from the electro-hydraulic pilot valve. The spool includes at least one axially extending rectangular slot which extends between spaced apart lands on the spool. The rectangular slot on the spool is in radial alignment with square holes in the sleeve which lead to the cylinder ports.

An adjustment device accessible on the exterior of the directional control valve housing permits adjusting and setting of the rotational position of the directional control valve spool. By rotating the valve spool relative to the sleeve, the circumferential extent of the opening defined by the square hole in the sleeve and the rectangular slot in the spool is changed to adjust and set the flow range for the valve. Because the inlet pressure reducing valve provides a constant pressure differential across this opening, the flow rate to the cylinder port will be proportional to the axial displacement of the spool and the magnitude of this flow rate can be adjusted and set by rotating the spool relative to the sleeve. In this manner, when the flow range of the electro-hydraulic proportional control valve according to this invention is to be changed, it is not necessary to replace the spool of the directional control valve but instead it is only necessary to adjust the spool rotationally relative to the sleeve.

BRIEF DESCRIPTION OF THE DRAWINGS

These and other aspects and advantages of the invention will be more readily apparent upon understanding the preferred embodiment of the invention shown in the accompanying drawings, wherein.

DETAILED DESCRIPTION OF THE DRAWINGS

Figure 1:
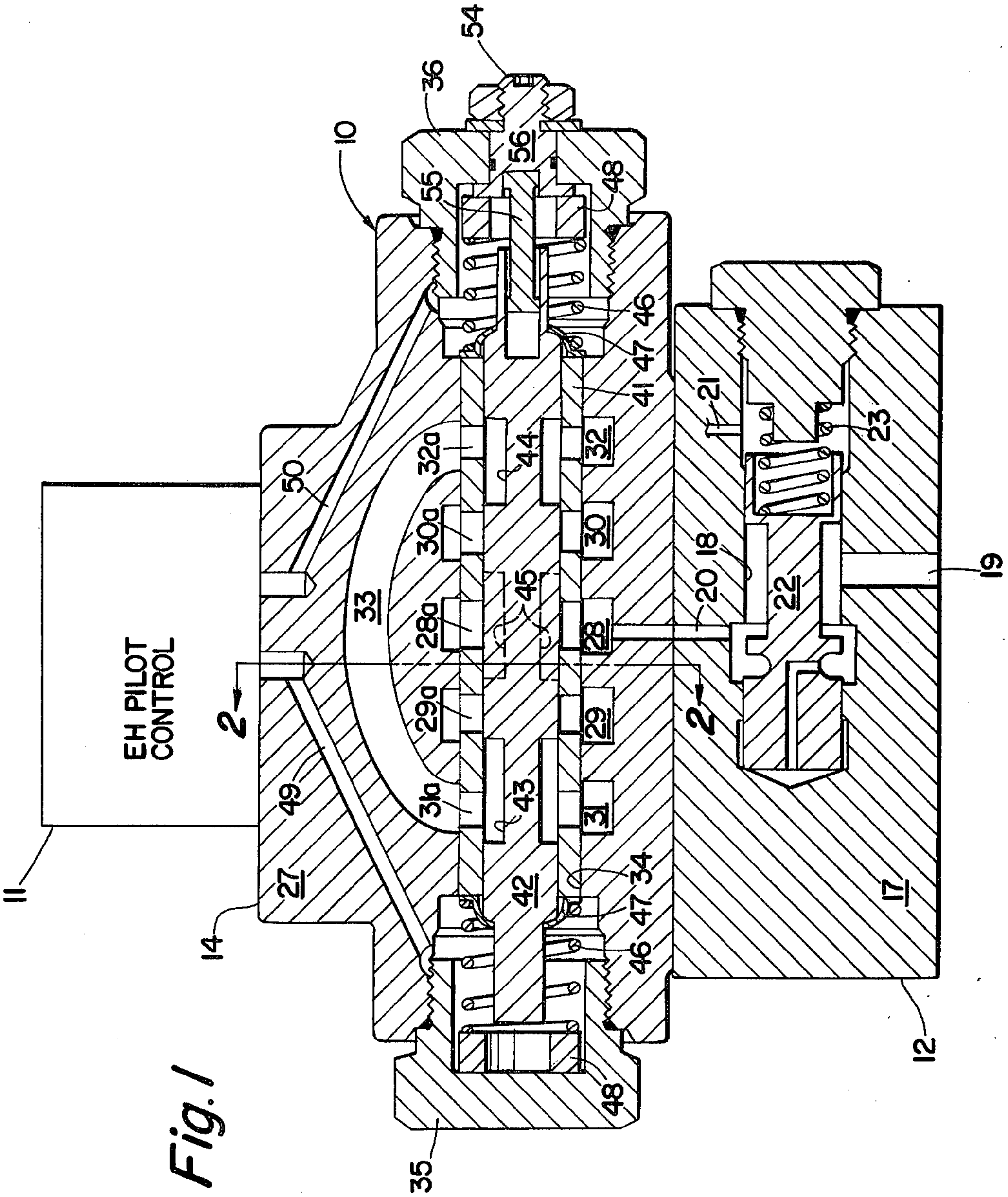
FIG. 1 is a cross-sectional side-elevational view of the electro-hydraulic proportional control valve according to the invention.

Referring now to the drawings in greater detail, FIG. 1 shows an electro-hydraulic proportional control valve 10 according to the principles of the invention. The valve 10 includes an electro-hydraulic pilot valve 11, an inlet pressure reducing valve 12, and a directional control valve 14.

The electro-hydraulic pilot valve 11 receives an electrical input or command signal from an electrical controller (not shown) and provides a hydraulic signal in response to the electrical signal. The structural details and operation of the pilot valve 11 are well known and are shown in the above-referenced U.S. Pat. No. 3,866,620.

The inlet pressure reducing valve 12 includes a housing 17 having a central bore 18. The bore 18 is intersected by an inlet passage 19 which receives fluid from the pump as explained in further detail below with reference to FIG. 3, a supply passage 20 which supplies fluid to the directional control valve 14, and a feedback passage 21 which receives a feedback signal from the high pressure side of the fluid motor that is to be controlled as also explained in further detail below with reference to FIG. 3.

A pressure reducing spool 22 is slidably disposed in the central bore 18 for reducing the fluid pressure from the inlet passage 19 to the supply passage 20. The left end face of the spool 22 is exposed to fluid pressure in the supply passage 20 upstream of the directional control valve 14. The right end face of the spool 22 is exposed to fluid pressure in the feedback passage 21 downstream of the directional control valve 14. The right end face of the pressure reducing spool 22 is also acted upon by a coil spring 23. The pressure reducing spool 22 shuttles back and forth in the bore 18 so that the force of the pressure in the supply passage 20 acting on the left end face of the end spool 22 is equal to the force created by the pressure in the feedback passage 21 acting on the right side of the reducing spool 22 and the force of the coil spring 23. In this manner, the reducing spool 22 will throttle the fluid flow from the inlet passage 19 to the supply passage 20 to maintain the pressure in the supply passage 20 a predetermined constant differential above the pressure downstream of the directional control valve 14 in the feedback passage 21.

The directional control valve 14 includes a housing 27, a supply port 28, cylinder ports 29 and 30, and exhaust ports 31 and 32. As will be explained in further detail below with reference to FIG. 3, the cylinder ports 29 and 30 are connected to a fluid motor or other suitable load that is to be controlled by the electro-hydraulic proportional control valve 10, and the exhaust ports 31 and 32 are connected by a loop 33 to a reservoir.

A central bore 34 extends from end to end through the housing 27 and intersects the ports 28–32. The ports 28–32 are each of an annular ring-like configuration, with each of the ports encircling the central bore 34. The opposite ends of the bore 34 are closed by suitable end caps 35 and 36 which are threadably and sealingly secured to the housing 27.

A cylindrical sleeve 41 is press fit in the bore 34. During assembly, the sleeve 41 is cooled and pressed into the bore 34, so that the sleeve 41 thereafter expands and is tightly locked in the bore 34 against axial or rotational movement. The sleeve 41 includes two radially opposite holes 28*a* extending radially through the sleeve 41 and connecting the port 28 with the inner surface of the sleeve 41. The holes 28*a* are round and are sufficiently large that unrestricted fluid pressure communication is always established between the supply port 28 and each of two square grooves provided in a spool within the sleeve 41 in a manner more fully described below. The sleeve 41 also includes two radially opposite round holes 31*a* and two radially opposite round holes 32*a* extending radially through the sleeve 41 and providing substantially unrestricted fluid pressure communication between the ports 31 and 32, respectively, and the inner surface of the sleeve 41. The sleeve 41 further includes two radially opposite square holes 29*a* and two radially opposite square holes 30*a* extending radially through the sleeve 41 from the cylinder ports 29 and 30, respectively, to the inner surface of the sleeve 41.

Still referring to FIG. 1, the directional control valve 14 also includes a spool 42 slidably disposed within the sleeve 41 for axial movement between a neutral position shown in FIG. 1, a leftward position and a rightward position. The spool 42 includes annular grooves 43 and 44 for communicating the cylinder ports 29 and 30 with the exhaust ports 31 and 32, respectively, when the spool 42 is displaced from its neutral position.

Figure 2:
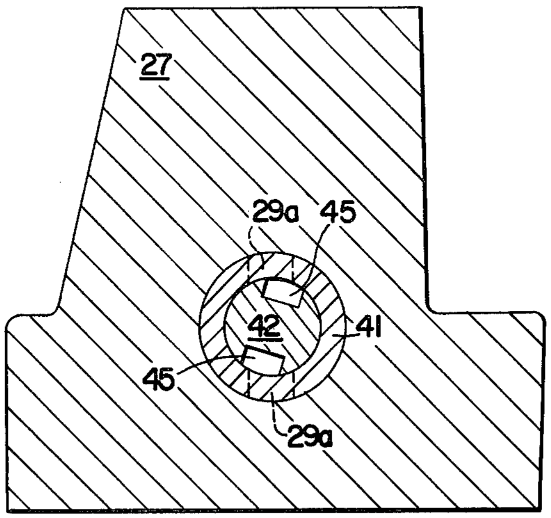
FIG. 2 is a cross-sectional view taken along reference view line 2—2 in FIG. 1.

As shown in FIGS. 1 and 2, the spool 42 also includes radially opposite, axially extending rectangular grooves 45. As shown in FIG. 2, the grooves 45 and the square holes 29*a* are of equal circumferential extent at the outer peripheral surface of the spool 42 and inner peripheral surface of the sleeve 41. Additionally, the juncture of the walls of the grooves 45 and the outer peripheral surface of the spool 42 forms longitudinally extending side metering edges and arcuately extending end metering edges. Similarly, the juncture of the walls of the square holes 29*a* and 30*a* and the inner peripheral surface of the sleeve 41 forms longitudinally extending side metering edges and circumferentially extending end metering edges. When the spool 42 is displaced from its neutral position 42, these metering edges cooperate in a manner described below to control the flow of fluid from the supply port 28 to the cylinder port 29 or to the cylinder port 30.

The spool 42 is biased to its center or neutral position by springs 46 which act between retainers 47 and spacers 48. Pilot passages 49 and 50 extend through the housing 27 and communicate the ends of the central bore 34 with the electro-hydraulic pilot valve 11. In this manner, fluid pressure in the pilot passages 49 or 50 will move the spool to the right or to the left, respectively, from the neutral position shown in FIG. 1.

Rotational adjusting movement of the spool 42 and rotational locking of the spool 42 is accomplished by an adjusting and locking device 54. The device 54 includes a drive shaft 55. The right end of the drive shaft 55 is rigidly connected such as by brazing to a rotatable adjusting link 56. The left end of the drive shaft 55 is provided with an externally splined portion which mates with an internally splined bore in the spool 42. This arrangement restrains relative rotational movement between the spool 42 and the drive shaft 55 while permitting relative axial movement. A lock nut on the adjusting link 56 permits locking the link 56, drive shaft 55 and spool 42 against rotational movement when a desired rotational position of the spool 42 is achieved.

Figure 3:
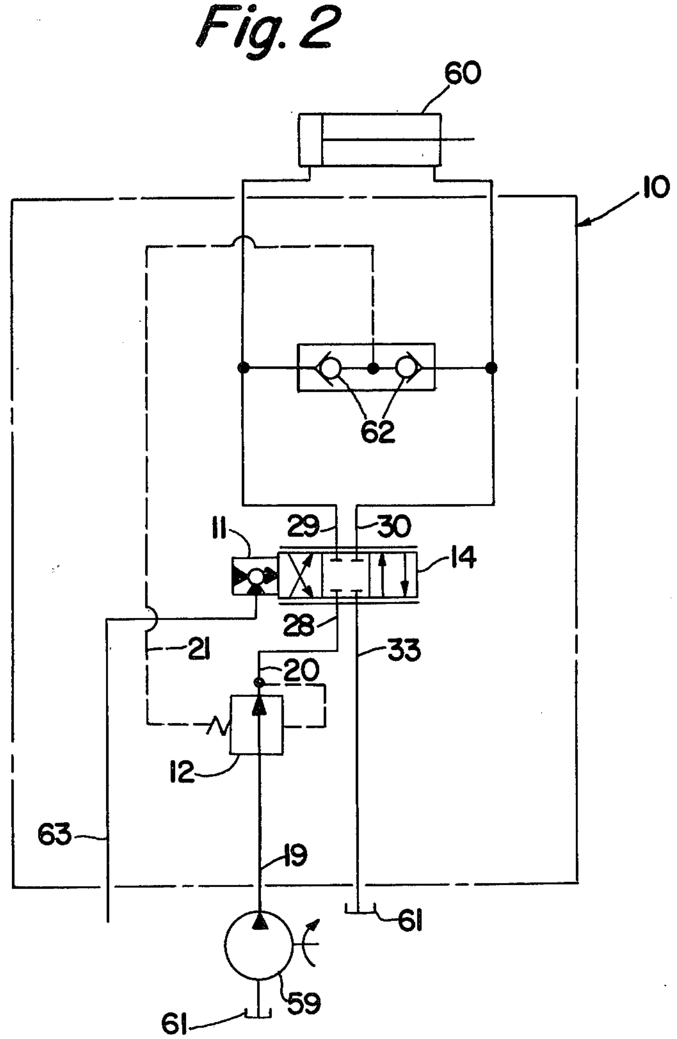
FIG. 3 is a schematic circuit diagram of a hydraulic circuit in which the electro-hydraulic proportional control valve shown in FIG. 1 may be used.

Referring now to FIG. 3, the electro-hydraulic proportional control valve 10 is shown schematically in a hydraulic circuit. A suitable pump 59, which may be a fixed displacement pump with a bypass valve for returning excess flow to the reservoir in a well known manner, supplies fluid pressure to the inlet passage 19 of the valve 10. The valve 10, acting in response to an electrical input signal through an electrical connection 63, selectively directs the fluid flow to one side of a fluid motor 60 and returns fluid from the other side of the fluid motor 60 to a reservoir 61. A pair of check valves 62 within the valve 10 communicate the high pressure side of the fluid motor 60 with the feedback passage 21 in a well-known manner.

When it is desired to supply fluid pressure to one side of the motor 60, an electrical signal is provided through the line 63 to the electro-hydraulic pilot valve 11. The electro-hydraulic pilot valve 11, acting in response to this electrical signal, provides fluid pressure to the pilot passage 49. This creates a pressure differential across the spool 42 and causes the spool 42 to move to the right against the bias of the spring 46. As this movement begins, the groove 43 begins to establish open connection between the cylinder port 29 and the exhaust port 31 through the holes 29*a* and 31*a*. As this happens, the square grooves 45 begin to establish metered connection between the supply port 28 and the cylinder port 30 through the two square holes 30*a*. Because the pressure differential between the ports 28 and 30 is maintained constant by the inlet pressure reducing valve 12, the fluid flow from the port 28 to the port 30 and motor 60 is proportional to the metering area defined by the metering edges of the grooves 45 on the outer peripheral surface of the spool 42 and the metering edges of the square holes 30*a* on the inner peripheral surface of the sleeve 41. As the spool 42 continues its movement to the right, this metering area will increase until the spool 42 bottoms against the link 56. When the spool 42 has reached its full rightward position, the flow from the supply port 28 to the cylinder port 30 and motor 60 will then remain constant because this metering area will be constant and the pressure drop across the metering area will be constant.

When the valve spool 42 is in the position shown in FIG. 2, an intermediate flow rate to the fluid motor 60 is achieved when the spool is in its full rightward position, because the grooves 45 are only partially aligned with the grooves 28*a*. If a smaller flow rate is desired, the spool 42 is rotated clockwise as viewed in FIG. 2 to diminish the metering area through which the fluid passes from the grooves 45 to the grooves 28*a*. Similarly, if this fluid flow rate is to be increased, the spool 42 is rotated counterclockwise by rotational movement of the adjusting link 56.

What is claimed is:

1. A control valve comprising a housing defining at least a portion of a supply passage and defining at least a portion of a load passage, a bore in said housing intersecting said supply passage and intersecting said load passage, a spool in said bore, said spool being axially movable in said bore between a first position and a second position, said spool having land means hydraulically isolating said supply passage from said load passage when said spool is in said first position, said spool having an outer peripheral surface and groove means defining a metering area, said groove means extending radially inwardly from said outer peripheral surface and being defined by groove walls, said groove walls intersecting said outer peripheral surface at circumferentially spaced axially extending metering edges and at axially spaced arcuately extending metering edges, said axially extending metering edges intersecting said arcuately extending metering edges, said groove means establishing metered fluid pressure communication between said supply passage and said load passage through said metering area when said spool is in said second position, and range adjustment means adjustably changing said metering area independently of axial movement of said spool in said bore, said range adjustment means including link means extending from said bore and projecting outside of said housing, and connector means between said link means and said spool restraining relative rotational movement between said spool and said link means and permitting relative axial movement between said spool and said link means.

2. A control valve as set forth in claim 1, wherein the circumferential extent of said groove at the intersection of said outer peripheral surface is less than 90°.

3. A control valve as set forth in claim 2, wherein said housing includes a cylindrical sleeve in said bore, said cylindrical sleeve includes a cylindrical inner peripheral surface, an opening in said inner peripheral surface communicating wtih said load passage, said opening being defined by side walls, said side walls and said inner peripheral surface of said sleeve defining metering edges, and said metering edges of said sleeve cooperatively defining said metering area with said metering edges of said spool.

4. A control valve comprising a housing, said housing having a first port and a second port, a bore intersecting said first and second ports, a valve spool slidably disposed in said bore, said spool including a smooth cylindrical outer peripheral surface, said spool being axially movable in said bore between first and second positions, said spool having land means hydraulically isolating said first and second ports when said spool is in said first position, said spool having groove means establishing metered fluid pressure communication between said first and second ports through a metering area when said spool is in said second position, said groove means including an axially extending groove in said spool, the juncture of said groove and said outer peripheral surface defining metering edges on said spool, said metering edges on said spool defining said metering area, adjustment means adjustably changing said metering area independently of axial movement of said spool relative to said sleeve, said adjustment means including link means extending from said bore and projecting outside said housing, and connector means between said link means and said spool restraining relative rotational movement between said spool and said link means and permitting relative axial movement between said spool and said link means.

5. A control valve comprising a housing, said housing having a first port and a second port, a bore intersecting said first and second ports, a cylindrical sleeve in said bore extending between said first and second ports, said sleeve having a smooth cylindrical inner peripheral surface, said sleeve having a first hole extending radially between said first port and said inner peripheral surface and a second hole extending radially between said second port and said inner peripheral surface, the juncture of said second hole and said inner peripheral surface defining a metering edge on said sleeve, a valve spool slidably disposed in said sleeve, said spool including a smooth cylindrical outer peripheral surface, said spool being axially movable in said bore between first and second positions, said spool having land means hydraulically isolating said first and second holes in said sleeve when said spool is in said first position, said spool having groove means establishing metered fluid pressure communication between said first and second holes through a metering area when said spool is in said second position, said groove means including an axially extending groove in said spool, the juncture of said groove and said outer peripheral surface defining metering edges on said spool, said metering edges on said spool and said metering edges on said sleeve cooperatively defining a metering area, adjustment means adjustably changing said metering area independently of axial movement of said spool relative to said sleeve, said adjustment means including link means extending from said bore and projecting outside said housing, and connector means between said link means and said spool restraining relative rotational movement between said spool and said link means and permitting relative axial movement between said spool and said link means.

6. A control valve comprising a housing, said housing having a first port and a second port, a bore intersecting said first and second ports, a valve spool slidably disposed in said bore, said spool including a smooth cylindrical outer peripheral surface, said spool being axially movable in said bore between first and second positions, said spool having land means hydraulically isolating said first and second ports when said spool is in said first position, said spool having groove means establishing metered fluid pressure communication between said first and second ports through a metering area when said spool is in said second position, said groove means including an axially extending groove in said spool, the juncture of said groove and said outer peripheral surface defining metering edges on said spool, said metering edges on said spool defining said metering area, adjustment means adjustably changing said metering area independently of axial movement of said spool relative to said sleeve, said adjustment means including link means for rotatably adjusting said spool, and connector means between said link means and said spool restraining relative rotational movement between said spool and said link means and permitting relative axial movement between said spool and said link means.

* * * * *